United States Patent
Melo et al.

(10) Patent No.: US 10,636,218 B2
(45) Date of Patent: Apr. 28, 2020

(54) AUGMENTED REALITY FOR AN AMUSEMENT RIDE

(71) Applicant: Universal City Studios LLC, Universal City, CA (US)

(72) Inventors: Anthony Melo, Orlando, FL (US); Akiva Meir Krauthamer, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/212,412

(22) Filed: Dec. 6, 2018

(65) Prior Publication Data

US 2020/0098182 A1 Mar. 26, 2020

Related U.S. Application Data

(60) Provisional application No. 62/735,754, filed on Sep. 24, 2018.

(51) Int. Cl.
| | |
|---|---|
| *G06T 19/00* | (2011.01) |
| *G06K 9/00* | (2006.01) |
| *G06T 13/40* | (2011.01) |

(52) U.S. Cl.
CPC ........ *G06T 19/006* (2013.01); *G06K 9/00228* (2013.01); *G06K 9/00342* (2013.01); *G06T 13/40* (2013.01)

(58) Field of Classification Search
CPC ............ G06K 9/00342; G06K 9/00228; G06T 19/006; G06T 13/40
See application file for complete search history.

(56) References Cited

U.S. PATENT DOCUMENTS

| | | | |
|---|---|---|---|
| 6,064,749 A | 5/2000 | Hirota et al. | |
| 6,400,374 B2 | 6/2002 | Lanier | |
| 6,661,418 B1 | 12/2003 | McMillan et al. | |
| 7,907,774 B2 | 3/2011 | Parr et al. | |

(Continued)

FOREIGN PATENT DOCUMENTS

| | | |
|---|---|---|
| CN | 106133796 A | 11/2016 |
| KR | 20040008791 A | 1/2004 |

OTHER PUBLICATIONS

PCT/US2019/048877 International Search Opinion and Written Opinion dated Oct. 22, 2019.

*Primary Examiner* — Michael Le
(74) *Attorney, Agent, or Firm* — Fletcher Yoder P.C.

(57) ABSTRACT

An augmented reality system for an amusement ride includes a facial recognition sensor that detects a guest's face, a skeletal recognition sensor that detects a guest's body, a presence sensor that detects a guest's presence, and a controller. The controller includes a processor and a memory. The controller is configured to generate an augmented reality animation based on a first signal indicative of the guest's presence received from the presence sensor. In response to receiving a second signal indicative of the guest's body from the skeletal recognition sensor, the controller is configured to update the augmented reality animation based on the guest's body. Further, in response to receiving a third signal indicative of the guest's face from the facial recognition sensor, the controller is configured to update the augmented reality animation based on the guest's face.

4 Claims, 4 Drawing Sheets

(56) References Cited

U.S. PATENT DOCUMENTS

| | | |
|---|---|---|
| 8,405,680 B1 | 3/2013 | Cardoso Lopes et al. |
| 8,553,037 B2 | 10/2013 | Smith et al. |
| 9,519,989 B2 | 12/2016 | Perez et al. |
| 2003/0012410 A1 | 1/2003 | Navab et al. |
| 2006/0293110 A1* | 12/2006 | Mendelsohn ............ A63G 1/00 472/137 |
| 2007/0121957 A1 | 5/2007 | Trowbridge et al. |
| 2007/0260984 A1 | 11/2007 | Marks et al. |
| 2009/0234666 A1* | 9/2009 | Crawford ................. A63G 1/00 705/301 |
| 2009/0272289 A1* | 11/2009 | Baker ...................... A63G 7/00 104/76 |
| 2011/0007079 A1* | 1/2011 | Perez ................. H04N 21/4532 345/473 |
| 2011/0174189 A1* | 7/2011 | Beutler ................... A63G 4/00 104/53 |
| 2011/0249201 A1* | 10/2011 | Turner .................. G03B 21/28 348/744 |
| 2011/0304629 A1 | 12/2011 | Winchester |
| 2012/0293635 A1 | 11/2012 | Sharma et al. |
| 2014/0362091 A1 | 12/2014 | Bouaziz et al. |
| 2016/0048203 A1* | 2/2016 | Blum ...................... G06F 3/012 104/84 |
| 2016/0328875 A1* | 11/2016 | Fang ....................... G06T 5/002 |
| 2017/0103571 A1* | 4/2017 | Beaurepaire ....... G01C 21/3667 |
| 2018/0253141 A1 | 9/2018 | McCracken |

* cited by examiner

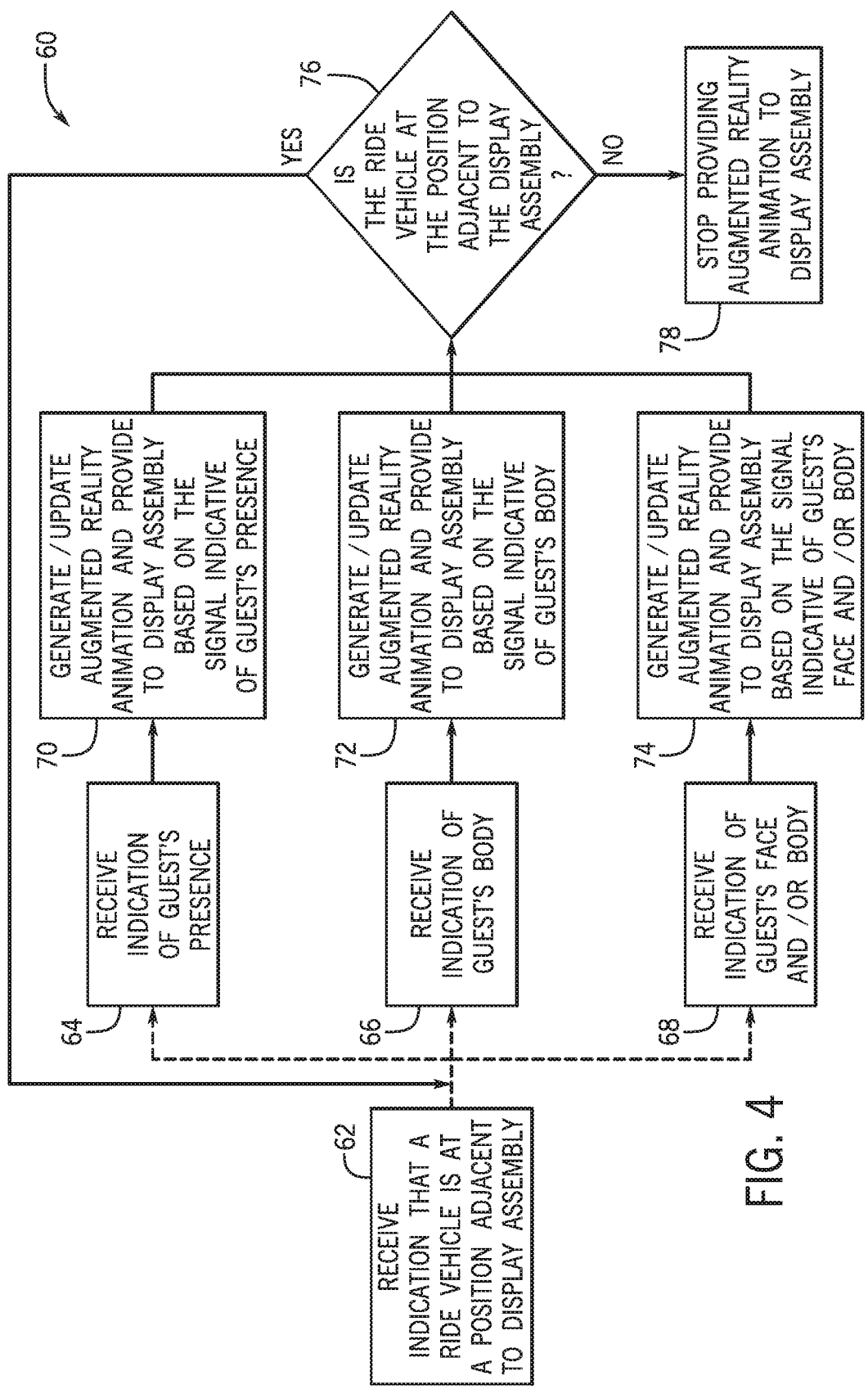

AUGMENTED REALITY FOR AN AMUSEMENT RIDE

CROSS-REFERENCE TO RELATED APPLICATIONS

This application claims priority from and the benefit of U.S. Provisional Application Ser. No. 62/735,754, entitled "Augmented Reality System For An Amusement Ride" and filed Sep. 24, 2018, the disclosure of which is incorporated herein by reference for all purposes.

BACKGROUND

The present disclosure relates generally to an augmented reality system, and more particularly to an augmented reality system for an amusement ride.

Generally, an amusement ride may include a ride vehicle and a ride path. The ride vehicle may move along the ride path and may carry guests. The amusement ride may also include a display that may provide certain images along the ride path to be viewed by the guests. For example, the display may provide certain animations, videos, augmented reality images, and other images. For certain rides, the guests may interact with the display to control the image. However, due to the complexity of some amusement rides, the display may not be configured to provide an image to the guest throughout the amusement ride. Additionally, the ability of the guests to interact with the displayed images on certain amusement rides may be limited.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an augmented reality system for an amusement ride includes a facial recognition sensor that detects a guest's face, a skeletal recognition sensor that detects a guest's body, a presence sensor that detects a guest's presence, and a controller. The controller includes a processor and a memory. The controller is configured to generate an augmented reality animation based on a first signal indicative of the guest's presence received from the presence sensor. In response to receiving a second signal indicative of the guest's body from the skeletal recognition sensor, the controller is configured to update the augmented reality animation based on the guest's body. Further, in response to receiving a third signal indicative of the guest's face from the facial recognition sensor, the controller is configured to update the augmented reality animation based on the guest's face.

DRAWINGS

These and other features, aspects, and advantages of the present disclosure will become better understood when the following detailed description is read with reference to the accompanying drawings in which like characters represent like parts throughout the drawings, wherein.

Figure 1:
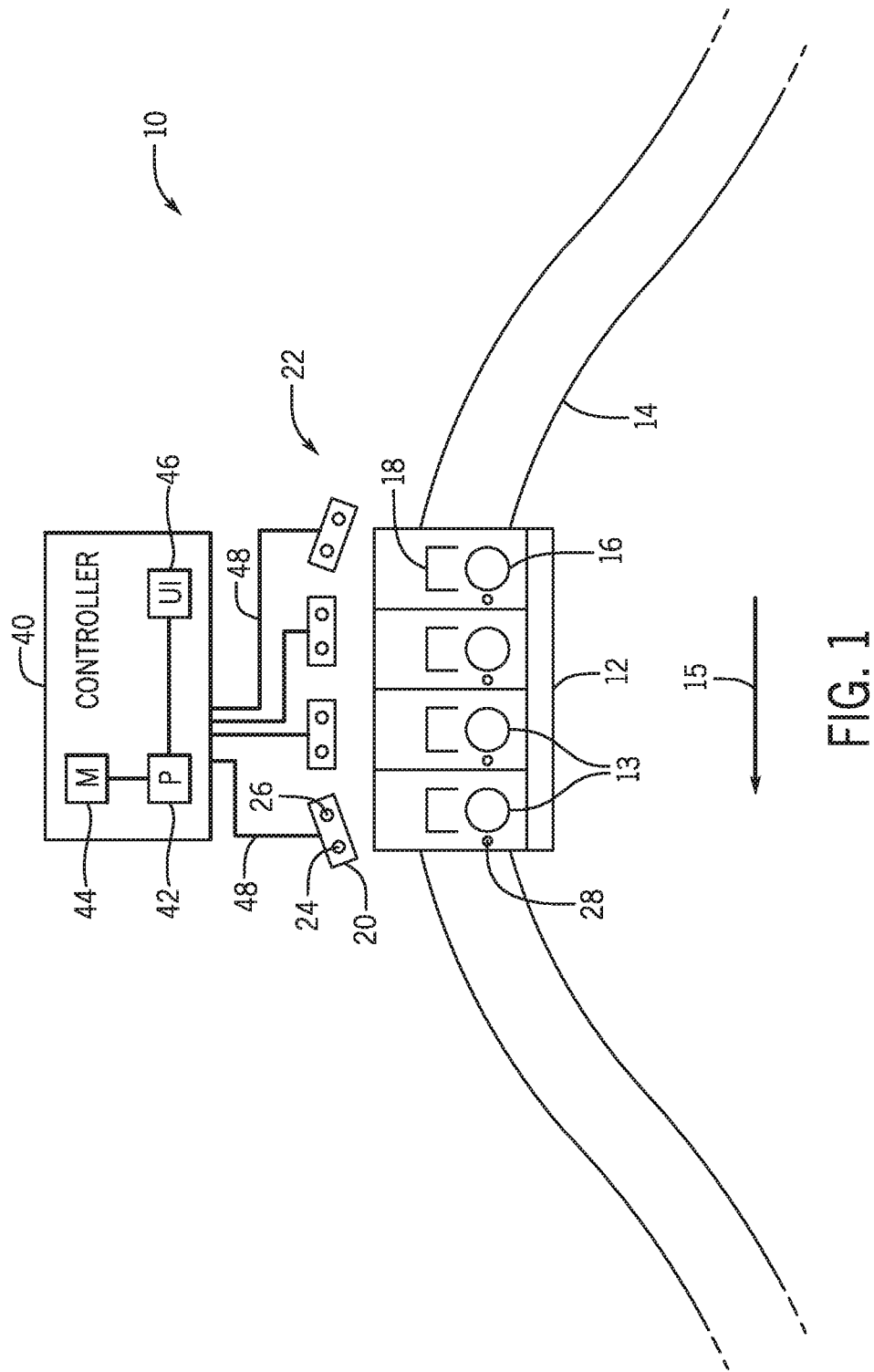
FIG. 1 is a top view of an embodiment of an amusement ride system, in accordance with an aspect of the present disclosure.
Figure 2:
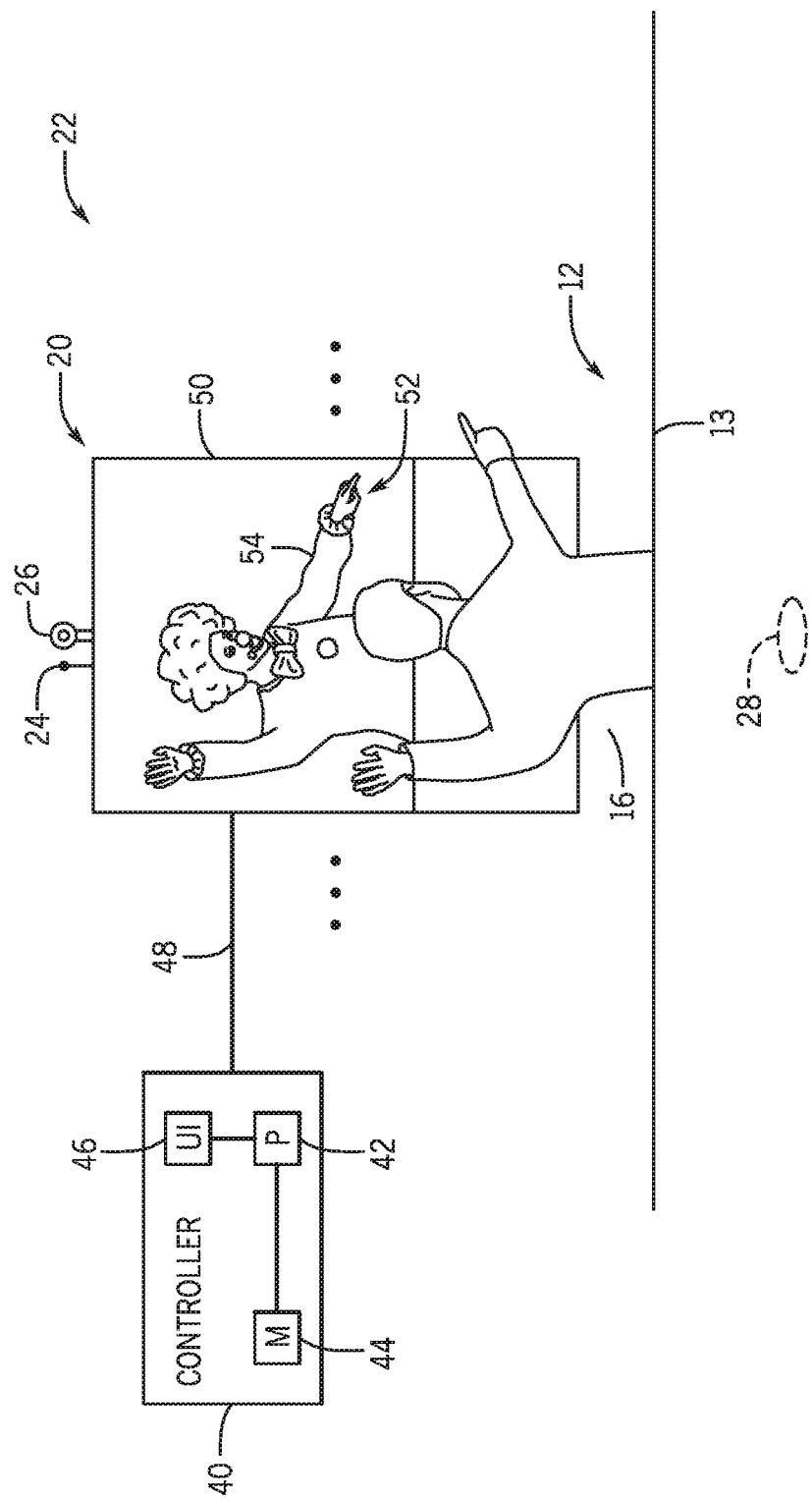
FIG. 2 is a side view of an embodiment of an augmented reality system of the amusement ride system of FIG. 1 including a display assembly with an augmented reality animation, in accordance with an aspect of the present disclosure.
Figure 3:
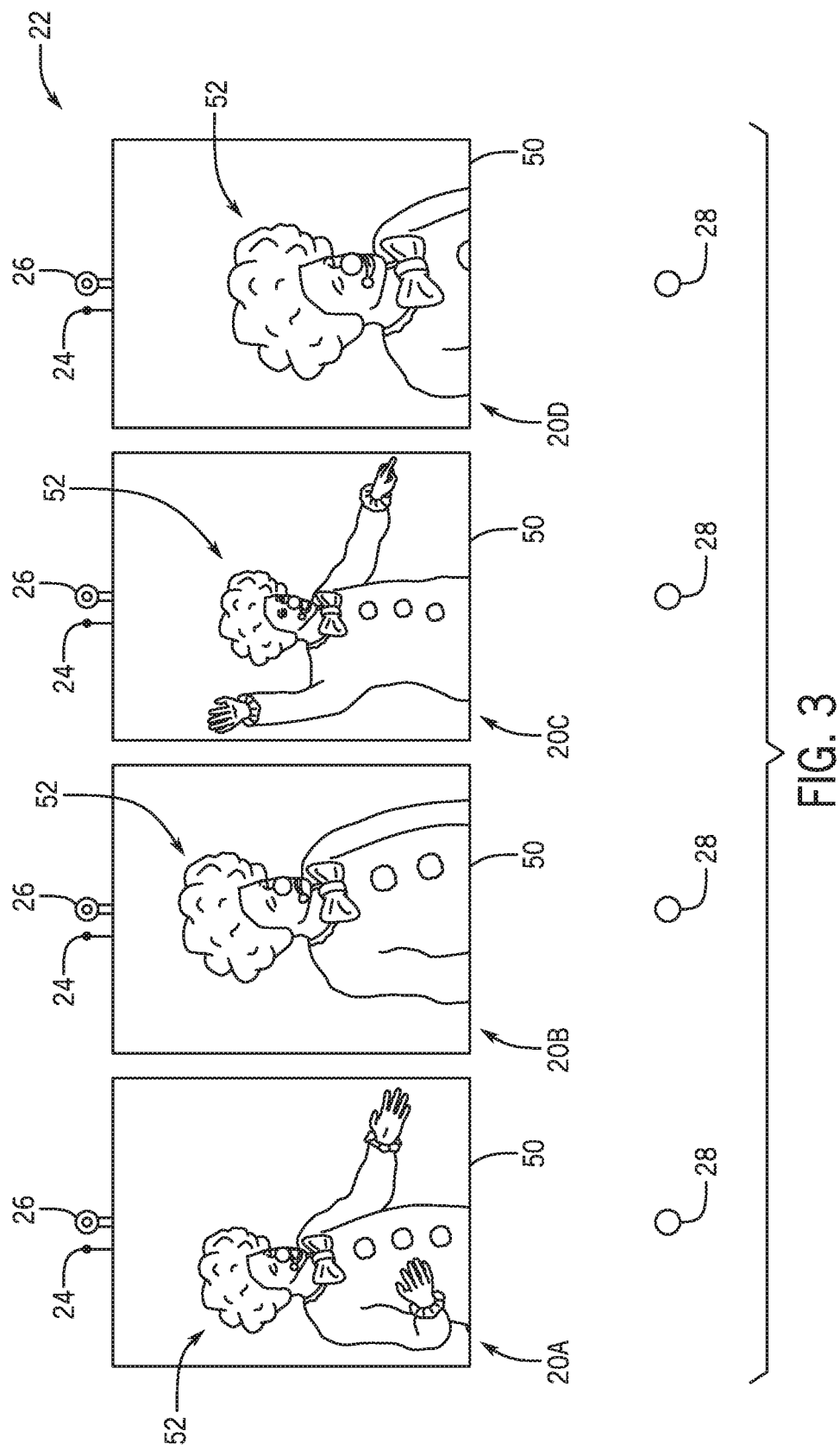

FIG. 3 is a side view of an embodiment of an augmented reality system of the amusement ride system of FIG. 1 including multiple display assemblies with individual augmented reality animations, in accordance with an aspect of the present disclosure; and FIG. 4 is a flow diagram of an embodiment of a process for generating, updating, and providing the augmented reality animation for the augmented reality system of FIG. 2, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include an amusement ride system having an augmented reality system. In certain embodiments, the amusement ride system and/or the augmented reality system include sensors configured to detect a guest's face, body, presence, or a combination thereof, while the guest rides in a ride vehicle of the amusement ride system. For example, a facial recognition sensor may detect a guest's face and/or body, a skeletal recognition sensor may detect the guest's body, and a presence sensor may detect the guest's presence in the ride vehicle. Each sensor may output signals to a controller of the augmented reality system. Based on the signals received from the sensors, the augmented reality system may generate an augmented reality animation and may provide the augmented reality animation to a display assembly disposed adjacent to and/or on the ride vehicle. For example, the display assembly may include a screen that is viewable by the guest. As such, the augmented reality system and/or the amusement ride system may detect the guest's face, body, presence, or a combination thereof, generate the augmented reality animation, and display the augmented reality animation for viewing by the guest. In certain embodiments, the augmented reality system may continuously detect the guest's face, body, presence, or any combination thereof, and may generate and provide the augmented reality animation based on the guest's face, body, presence, or the combination thereof, to allow the guest to interact with and/or control the augmented reality animation throughout at least a portion of the amusement ride system.

With the foregoing in mind, the present embodiments relating to an augmented reality system may be utilized in any amusement ride system. For example, FIG. 1 is a top view of an embodiment of an amusement ride system 10. As illustrated, the amusement ride system 10 includes a ride vehicle 12 having one or more seats 13. The ride vehicle 12 may generally travel along a ride path 14 in a direction 15 and may carry guests 16 through the amusement ride system 10. For example, the guests 16 may be seated in the seats 13 and may be restrained by seat restraints 18 as the ride vehicle 12 travels through the amusement ride system 10. The seat restraints 18 may be a lap bar, a seat belt, an overhead restraint, another type of seat restraint, or a combination thereof. In the illustrated embodiment, the ride vehicle 12 includes four seats 13, though the ride vehicle 12 may include a different number of seats in other configurations. Additionally, in certain embodiments, the amusement ride system 10 may include additional ride vehicles 12 (e.g., two ride vehicles 12, three ride vehicles 12, four ride vehicles 12).

As illustrated, the ride path 14 is a rail system having a track defining the motion of the ride vehicle 12. However, in other embodiments, the ride path 14 may be a path along a floor of the amusement ride system 10 or may be another system configured to carry and/or guide the ride vehicle 12. For example, the ride vehicle 12 may be an automobile, and the ride path 14 may be a pathway configured to guide the ride vehicle 12. Additionally, the ride vehicle 12 is illustrated with the guests 16 facing sideways toward display assemblies 20 and generally crosswise (e.g., perpendicular) to the direction 15. In certain embodiments, the guests 16 may be positioned to face along the direction 15 such that the display assemblies 20 are at a side of the guests 16. In certain embodiments, the guests 16 may change position while moving along the ride path 14 and/or while stationary on the ride path 14. For example, the guests 16 may change from the illustrated side-facing position to a front-facing position and/or to another position.

The display assemblies 20 may be coupled and/or mounted to a side of the ride vehicle 12 such that the display assemblies 20 move with the ride vehicle 12 as the ride vehicle 12 moves along the ride path 14. Additionally or alternatively, the display assemblies 20 may be coupled and/or mounted to the ride path 14 such that the ride vehicle 12 may pass by the display assemblies 20 as the ride vehicle 12 moves along the ride path 14 in the direction 15. In some embodiments, the display assemblies 20 may be positioned generally in front of the ride vehicle 12 along the direction 15 such that guests 16 facing forward along the direction 15 may view the display assemblies 20 in front of them.

The amusement ride system 10 includes an augmented reality system 22. As illustrated, the augmented reality system 22 includes four display assemblies 20, four facial recognition sensors 24, four skeletal recognition sensors 26, and four presence sensors 28. However, in certain embodiments, the augmented reality system 22 may include more or fewer display assemblies 20, facial recognition sensors 24, skeletal recognition sensors 26, and/or presence sensors 28. Additionally or alternatively, the augmented reality system 22 may include other types of sensors and/or equipment that may detect the guest's head, body, presence, the guest's surroundings, or a combination thereof. In certain embodiments, the augmented reality system 22 may include all or portions of the ride vehicle 12 and/or the ride path 14. For example, the augmented reality system 22 may include a presence sensor 28 in each seat 13 of the ride vehicle 12.

As explained in greater detail below, the augmented reality system 22 may provide augmented reality images and animations for viewing and/or interaction by the guests 16. The augmented reality animations could include graphics or animations overlaid on a captured image or animation of the guest 16 such that the graphics or animation appear to be a part of the guest 16 within the augmented reality animation. Such graphics or animations could include replacing a guest's facial feature with animated facial features (e.g., replacing the guest's nose and eyes with an animal's nose and eyes), replacing the guest's head with an animated head, replacing the guest's body with an animated body, other modifications to the captured image or animation of the guest 16. In certain embodiments, the animation may be displayed on the entire display assembly 20. For example, in such an embodiment, the entire augmented reality animation is animated and does not include a captured image of the guest 16 and/or the guest's surroundings.

The facial recognition sensors 24 are configured to detect facial features of the guests 16. For example, one of the facial recognition sensors 24 may be positioned in front of a specific guest 16 and may detect facial features of that guest 16. The facial recognition sensor 24 may also detect skeletal features of the guest 16. In certain embodiments, the facial recognition sensor 24 may be a camera configured to detect facial and/or skeletal features (e.g., a red/blue/green (RGB) detecting camera or a camera with similar detection capabilities). The facial recognition sensor 24 may be disposed above and/or may be coupled to the display assembly 20. The facial recognition sensor 24 may accurately detect the guest's facial features and may allow the guest 16 to interact with the augmented reality system 22 and/or the amusement ride system 10. For example, while the guest 16 is viewing an augmented reality animation on the display assembly 20, the facial recognition sensor 24 may continue to monitor and detect the guest's facial features and may update the augmented reality animation on the display assembly 20 based on the guest's moving facial features. The augmented reality animation may include replacing a portion or all of the guest's facial features with animated facial features (e.g., replacing the guest's nose with an animated nose). As such, the guest 16 may interact with and/or control the augmented reality animation, via the facial recognition sensor 24, by moving their facial features and/or head. In certain embodiments, the facial recognition sensor 24 may be mounted to the ride vehicle 12 or to another portion of the amusement ride system 10.

The skeletal recognition sensors 26 are configured to detect skeletal features of the guests 16. For example, the skeletal recognition sensor 26 may be a depth sensor disposed in front of a specific guest 16 that may detect the guest's head and/or body. The skeletal recognition sensor 26 may be a second camera disposed generally above the display assembly 20 or may be another type of sensor configured to detect the guest's head and/or body. The skeletal recognition sensor 26 may be disposed above and/or may be coupled to the display assembly 20 such that the skeletal recognition sensor 26 may accurately detect the guest's head and/or body and may allow the guest 16 to interact with the augmented reality system 22 and/or the amusement ride system 10 by moving their head and/or body. For example, while the guest 16 is viewing the augmented reality animation on the display assembly 20, the skeletal recognition sensor 26 may continue to monitor and detect the guest's head and/or body and may update the augmented reality animation on the display assembly 20 based on the guest's moving head and/or body. The augmented reality animation may include replacing a portion or all of the guest's facial features with animated facial features (e.g., replacing the guest's nose with an animated nose). As such, the guest 16 may interact with and/or control the augmented reality animation, via the skeletal recognition sensor 26, by moving their head and/or body. In certain embodiments, the skeletal recognition sensor 26 may be mounted to the ride vehicle 12 or to another portion of the amusement ride system 10.

The presence sensors 28 are configured to detect a presence of the guests 16 in the ride vehicle 12. For example, the ride vehicle 12 may include a corresponding presence sensor 28 for each seat 13. The presence sensor 28 may detect the presence of a guest 16 in the seat 13. For example, the presence sensor 28 may be a pressure sensor configured to detect a weight of the guest 16 in the seat 13. In certain embodiments, the presence sensor 28 may be the seat restraint 18 for the seat 13. For example, after the guest 16 is positioned in the seat 13, the seat restraint 18 may be secured in a manner that indicates the presence of the guest 16 in the seat 13. After the presence sensor 28 detects the presence of the guest 16, the display assembly 20 may provide an augmented reality animation for viewing by the guest 16. The augmented reality animation may include an animation that appears to be seated in the seat 13 as shown on the display assembly 20 or may include an animation that takes up the entire screen of the display assembly 20 (e.g., does not display a portion of the ride vehicle 12 and/or guest's surroundings).

Additionally or alternatively, in certain embodiments, the amusement ride system 10 and/or the augmented reality system 22 may include animated figures (e.g., animatronics) in place of or in addition to the display assemblies 20. Such animated figures may be robotic figures that may be controlled to mimic the guests' movement. For example, the augmented reality system 22 may control the animated figures based on the signal(s) received from the facial recognition sensors 24, the skeletal recognition sensors 26, and/or the presence sensors 28 to allow the guests to interact with the animated figures and the augmented reality system 22. In some embodiments, the amusement ride system 10 and/or the augmented reality system 22 may replace the display assemblies 20 with the animated figures based on the signals received from the sensors and/or based on the position of the ride vehicle 12 along the ride path 14.

The amusement ride system 10 and/or the augmented reality system 22 may include a controller 40. As illustrated, the controller 40 includes a processor 42 and a memory 44. In certain embodiments, the amusement ride system 10 and/or the augmented reality system 22 may include additional controllers, processors, memories, or a combination thereof, to perform various functions. For example, each display assembly 20 may include a controller configured to receive signals from various sensors, control an animation on the display assembly 20, communicate with the controller 40, or a combination thereof. In some embodiments, the memory 44 and other memories of the amusement ride system 10 may include one or more tangible, non-transitory, computer-readable media that store instructions executable by the processor 42 and/or data to be processed by the processor 42. For example, the memory 44 may include random access memory (RAM), read-only memory (ROM), rewritable non-volatile memory such as flash memory, hard drives, optical discs, other types of memory, or a combination thereof. Additionally, the processor 42 and other processors of the amusement ride system 10 may include one or more general purpose microprocessors, one or more application-specific integrated circuits (ASICs), one or more field programmable gate arrays (FPGAs), or any combination thereof.

The controller 40 may further include a user interface 46 that may facilitate communication between the controller 40 and a user (e.g., an operator). The user interface 46 may be disposed adjacent to the amusement ride system 10 or at a remote location in the case of a remotely controlled or autonomously operated amusement ride system. For example, the user interface 46 may include one or more of a button, a keyboard, a mouse, a trackpad, and/or the like to allow user interaction with the controller 40. Additionally, the user interface 46 may include an electronic display to provide a visual representation of information, for example, via a graphical user interface (GUI), an application interface, text, a still image, video content, or a combination thereof. The user interface 46 may be configured to receive inputs from a user (e.g., an operator of the amusement ride system 10 and/or the augmented reality system 22).

In operation, the controller 40, via the processor 42, may receive various input signals from sensors throughout the amusement ride system 10 and/or the augmented reality system 22. For example, each of the facial recognition sensors 24, the skeletal recognition sensors 26, and the presence sensors 28 may output signals indicative of their detected features (e.g., the guest's detected facial features, head, body, presence) to the controller 40. The signals output by the facial recognition sensors 24, the skeletal recognition sensors 26, and the presence sensors 28 may be received at the processor 42 of the controller 40. In certain embodiments, each display assembly 20 may include a display controller that receive signals from the facial recognition sensors 24, the skeletal recognition sensors 26, and the presence sensors 28. The display controllers may further communicate with the controller 40 and/or may generate and provide animations to be displayed for viewing by the guests 16.

As illustrated, each display assembly 20 is connected to and communicates with the controller 40 via a wired connection 48 (e.g., Ethernet, universal serial bus (USB), can-bus, ISObus). For example, each display assembly 20 may output signals to and receive signals from the controller 40 via the wired connection 48. Additionally or alternatively, each display assembly 20 may communicate with the controller 40 via a wireless connection. For example, each display assembly 20 may include a display transceiver that outputs signals to and receives signals from a controller transceiver of the controller 40. Each of the display transceivers and the controller transceiver may utilize any suitable wireless communication protocol, such as a standard protocol (e.g., Wi-Fi, Bluetooth), or a proprietary protocol.

FIG. 2 is an elevation view of an embodiment of the augmented reality system 22. As illustrated, the augmented reality system 22 includes the display assembly 20, the facial recognition sensor 24, the skeletal recognition sensor 26, and the presence sensor 28. The facial recognition sensor 24 is configured to detect the guest's face and output a signal indicative of the guest's face to the controller 40, the skeletal recognition sensor 26 is configured to detect the guest's body and output a signal indicative of the guest's body to the controller 40, and the presence sensor 28 is configured to detect the guest's presence and output a signal indicative of the guest's presence to the controller 40. In certain embodiments, the augmented reality system 22 may include additional display assemblies 20, facial recognition sensors 24, skeletal recognition sensors 26, and presence sensors 28. Further, the guest 16 may be seated in the seat 13 of the ride vehicle 12 or may be standing in the ride vehicle 12.

The illustrated embodiment of the display assembly 20 includes a screen 50 that provides an augmented reality animation 52 for viewing by the guest 16. As illustrated, the augmented reality animation 52 includes a clown 54 that may be controlled by the guest 16 based on the guest's movement. In certain embodiments, the augmented reality animation 52 may include other images and animations in addition to, or instead of, the clown 54 (e.g., a barn animal, a cartoon, a character).

In certain embodiments, the controller 40 may include instructions for generating and providing the augmented reality animation 52 to be displayed on the screen 50 based on the signal(s) received from the facial recognition sensors 24, the skeletal recognition sensors 26, the presence sensors 28, or a combination thereof. For example, based on a first signal indicative of the guest's presence received from the presence sensor 28, the controller 40 may generate the augmented reality animation 52 and may provide the augmented reality animation 52 to the display assembly 20 for viewing by the guest 16. The augmented reality animation 52 may be positioned on the screen 50 at a location generally corresponding to the position of the guest 16. However, in certain embodiments, the first signal indicative of the guest's presence does not, by itself, allow interaction between the guest 16 and certain or all augmented reality animations.

In response to receiving a second signal indicative of the guest's body from the skeletal recognition sensor 26, the controller 40 may update the augmented reality animation 52 based on the guest's body. For example, if the controller 40 initially received the first signal indicative of the guest's presence as described above and subsequently received the second signal indicative of the guest's body, the controller 40 may update the augmented reality animation 52 to mimic movement of the guest's body. In certain embodiments, if the controller 40 simultaneously receives both the first signal indicative of the guest's presence from the presence sensor 28 and the second signal indicative of the guest's body from the skeletal recognition sensor 26, the controller 40 may generate the augmented reality animation 52 based on the guest's body. For example, the augmented reality animation 52 may be an animation that mimics movement of the guest 16. In this manner, the controller 40 may allow the guest 16 to control a body of the augmented reality animation 52.

In response to receiving a third signal indicative of the guest's face and/or body from the facial recognition sensor 24, the controller 40 may generate or update the augmented reality animation 52 based on the guest's face and/or body. For example, if the controller 40 receives the first signal indicative of the guest's presence from the presence sensor 28, the second signal indicative of the guest's body from the skeletal recognition sensor 26, and the third signal indicative of the guest's face and/or body from the facial recognition sensor 24, the controller 40 may generate the augmented reality animation 52 based on the guest's face and/or body. The augmented reality animation 52 may include portions of a video feed such as captured images/video of the guest 16, of the ride vehicle 12, and/or the guest's surrounding (e.g., a video feed captured by the facial recognition sensor 24). The augmented reality animation 52 may also include animations overlaid on the video feed such that the animations appear to be part of the guest 16 and/or part of the video feed. For example, the augmented reality animation 52 may include portions of a captured video (e.g., live video feed) of the guest 16 positioned within the ride vehicle 12 and animations that appear to be part of the guest 16 and/or part of the guest's surroundings. The animation may include replacing some of the guest's facial features, body parts, the entire guest's body, or a combination thereof. In this manner, the controller 40 may allow the guest 16 to control facial features and/or a head of the augmented reality animation 52. In certain embodiments, the controller 40 may generate and provide the augmented reality animation 52 based on both the second signal indicative of the guest's body and the third signal indicative of the guest's face and/or body to allow the guest 16 to interact with and control both a body and facial features of the augmented reality animation 52. Additionally, the controller 40 may update a previously generated augmented reality animation 52 that was based on the guest's presence and/or body to include control of the facial features. The facial recognition sensor 24, along with the skeletal recognition sensor 26 and the presence sensor 28, may continue to detect and output signals to the controller 40. As the controller 40 receives each of the signals, the controller 40 generates and/or updates the augmented reality animation 52 based on the received signals.

In certain embodiments, the amusement ride system 10 may include elements that prevent certain sensors from detecting a guest's features (e.g., face and body). For example, as the ride vehicle 12 travels along the ride path 14, elements of the amusement ride system 10 may prevent certain sensors of the facial recognition sensors 24 and the skeletal recognition sensors 26 from detecting and/or tracking the guest's respective features (e.g., face and body). If a given sensor (e.g., the facial recognition sensor 24 or the skeletal recognition sensor 26) is not able to detect the guest 16, the controller 40 may generate and provide the augmented reality animation based on a signal received from another sensor (e.g., the skeletal recognition sensor 26 or the presence sensor 28).

For example, if the controller 40 first receives the signal indicative of the guest's body from the skeletal recognition sensor 26 and does not receive the signal indicative of the guest's face from the facial recognition sensor 24, the controller 40 may generate and provide the augmented reality animation 52 to the display assembly 20 based on the guest's body. Further, if the controller 40 receives the signal indicative of the guest's presence from the presence sensor 28 and does not receive the signal indicative of the guest's face or the signal indicative of the guest's body, the controller 40 may generate and provide the augmented reality animation 52 to the display assembly 20 based on the guest's presence. However, after receiving the signal indicative of the guest's presence from the presence sensor 28, if the controller 40 receives the signal indicative of the guest's face from the facial recognition sensor 24 or the signal indicative of the guest's body from the skeletal recognition sensor 26, the controller 40 would then generate an updated augmented reality animation 52 based on the newly received signal (e.g., the signal indicative of the guest's face and/or body from the facial recognition sensor 24 or the signal indicative of the guest's body from the skeletal recognition sensor 26). In this manner, the augmented reality animation 52 or the guest's ability to control the augmented reality animation 52 may change based on the signals received by the controller 40 from the various sensors.

FIG. 3 is an elevation view of an embodiment of the augmented reality system 22. As illustrated, the augmented reality system 22 includes four display assemblies 20, four facial recognition sensors 24, four skeletal recognition sensors 26, and four presence sensors 28. In certain embodiments, the augmented reality system 22 may include more or fewer display assemblies 20, facial recognition sensors 24, skeletal recognition sensors 26, presence sensors 28, or a combination thereof. Additionally, each display assembly 20 may be controlled by an independent controller (e.g., the controller 40 of FIGS. 1 and 2) configured to provide the augmented reality animation 52 to be displayed on the display assembly 20. For example, the controller 40 may receive signals from a corresponding facial recognition sensor 24, a corresponding skeletal recognition sensor 26, a corresponding presence sensor 28, or a combination thereof, and may generate the augmented reality animation 52 based on the received signals. In certain embodiments, a single controller may receive signals from all the sensors of the augmented reality system 22 and may control all the display assemblies 20.

In certain embodiments, the amusement ride system 10 and/or the augmented reality system 22 may include a display assembly that displays multiple augmented reality animations. For example, the single display assembly may be viewable by multiple guests 16 and may display an augmented reality animation 52 for each guest 16. The controller may generate multiple augmented reality animations 52 for each guest 16 and provide the multiple augmented reality animations 52 to the single display assembly.

The controller of each display assembly 20 may provide varying augmented reality animations 52 for each display assembly 20. For example, the augmented reality animation 52 displayed on each screen 50 is different in the illustrated embodiment of FIG. 3. The guests viewing and/or interacting with the display assemblies 20 may have varying levels of control over the augmented reality animation 52 displayed on their respective display assembly 20. For example, a first guest positioned adjacent to a first display assembly 20A may be able to control facial features and/or body movement of the augmented reality animation 52 displayed on the first display assembly 20A based on a corresponding one of the facial recognition sensors 24 being able to detect the first guest's facial features and/or body. A second guest positioned adjacent to a second display assembly 20B may be able to control body movement of the augmented reality animation 52 displayed on the second display assembly 20B based on a corresponding one of the skeletal recognition sensors 26 being able to detect the second guest's body. A third guest positioned adjacent to a third display assembly 20C may control both the body movement and the facial features of the augmented reality animation 52 displayed on the third display assembly 20C based on a facial recognition sensor 24 being able to detect the third guest's facial features and/or body and based on a skeletal recognition sensor 26 being able to detect the third guest's body. A fourth guest positioned adjacent to a fourth display assembly 20D may be able to view the augmented reality animation 52 displayed on the fourth display assembly 20D based on a presence sensor 28 being able to detect the fourth guest's presence (e.g., in the ride vehicle 12). In some embodiments, as described herein, some or all of the screens 50 may be replaced with animated figures (e.g., animatronics) that generally mimic the guests' movement.

FIG. 4 is a flow diagram of an embodiment of a method 60 for generating and/or updating the augmented reality animation 52 of FIGS. 2 and 3. Although shown in a particular sequence, it should be noted that the operations described with respect to the method 60 may be performed in different orders than shown and described and, indeed, such permutations of the method 60 are encompassed by the present disclosure. The method 60 may be performed by the augmented reality system 22, for example by the controller 40. The controller 40 may first receive an indication that the ride vehicle 12 of FIG. 1 has reached a position in front and/or adjacent to the display assemblies 20, as indicated by block 62. For example, the controller 40 may receive the indication from a second controller of the amusement ride system 10. The second controller may be configured to track a location of the ride vehicle 12 along the ride path 14 and output signals to the controller 40 indicative of the location of the ride vehicle 12.

In certain embodiments, the controller 40 may receive an indication that a ride sequence has started. The memory 44 of the controller 40 may store ride path data that includes information about the ride vehicle's position along the ride path 14 as a function of time and/or other factors. Based on an amount of elapsed time and/or based on the other factors, the controller 40 may determine that the ride vehicle 12 has reached the position in front of and/or adjacent to the display assemblies 20. In certain embodiments, the block 62 of the method 60 may be omitted such that an indication that a ride sequence has started and/or an indication that the ride vehicle 12 has reached the position adjacent to the display assemblies 20 is not necessarily used.

Next, the controller 40 may receive an indication of the guest 16 from any of the facial recognition sensors 24, the skeletal recognition sensors 26, and the presence sensors 28. For example, at block 64, the controller 40 may receive an indication of the guest's presence from the presence sensor 28. At block 66, the controller 40 may receive an indication of the guest's body from the skeletal recognition sensor 26. At block 68, the controller 40 may receive an indication of the guest's face and/or body from the facial recognition sensor 24.

Based on the received indication of the guest 16, the controller 40 may generate and/or update the augmented reality animation 52 and provide the generated and/or updated augmented reality animation 52 to the respective display assembly 20. For example, at block 70, based on the indication of the guest's presence, the controller 40 may generate/update and provide the augmented reality animation 52 to the display assembly 20. The display assembly 20 may display the augmented reality animation 52 in a position corresponding to the guest's presence in the ride vehicle 12 for viewing by the guest 16.

At block 72, based on the indication of the guest's body, the controller 40 may generate/update and provide the augmented reality animation 52 to the display and allow the guest 16 to view and interact with the augmented reality animation 52 displayed on the display assembly 20. The guest 16 may move their body (e.g., head, arms, torso), and the controller 40 may update the augmented reality animation 52 to generally match the movement of the guest's body for viewing by the guest 16. At block 74, based on the indication of the guest's face and/or body, the controller 40 may generate/update and provide the augmented reality animation 52 to allow the guest 16 to view and interact with the augmented reality animation 52 displayed on the display assembly 20. The guest 16 may move their facial features (e.g., eyes, eyebrows, nose, mouth) and/or body, and the controller 40 may update the augmented reality animation 52 to generally match the movement of the guest's facial features and/or body (e.g., a happy face, a sad face, a laughing face, movement of eyes, movement of a mouth, and movement of other facial features of the augmented reality animation 52) for viewing by the guest 16.

The controller 40 may determine which indication to use to generate and/or update the augmented reality animation 52 based upon an amount of interaction the indication and corresponding augmented reality animation 52 would allow the guest 16. For example, if the controller 40 receives both the indication of the guest's presence from the presence sensor 28 (e.g., the signal indicative of the guest's presence from the presence sensor 28) and the indication of the guest's face and/or body from the facial recognition sensor 24, the controller 40 may generate and/or update the augmented reality animation 52 based on the guest's face and/or body. This will allow the guest 16 greater interaction with the amusement ride system 10 by allowing the guest 16 to move their facial features and to view the augmented reality animation 52 with similar movement.

By way of another example, if the controller 40 receives both the indication of the guest's presence from the presence sensor 28 and the indication of the guest's body from the skeletal recognition sensor 26, the controller 40 may generate and/or update the augmented reality animation 52 based on the guest's body. Further, if the controller 40 receives both the indication of the guest's body from the skeletal recognition sensor 26 and the indication of the guest's face and/or body from the facial recognition sensor 24, the controller 40 may generate and/or update the augmented reality animation 52 based on the guest's face and/or body. In certain embodiments, the controller 40 may generate and/or update the augmented reality animation based on the indication of the guest's body received from the skeletal recognition sensor 26 and the indication of the guest's face and/or body received from the facial recognition sensor 24 to allow the guest 16 to interact with both a body and a face of the augmented reality animation 52.

After generating and/or updating the augmented reality animation 52, the method 60 may proceed to query 76. At query 76, the controller 40 may determine whether the ride vehicle is still in the position in front of and/or adjacent to the display assembly 20. For example, the controller 40 may receive a signal from the second controller that the ride vehicle 12 is still in the position or may determine that the ride vehicle 12 is still in the position based on information stored in the memory 44 of the controller 40. Based on a determination that the ride vehicle 12 is still in the position in front of and/or adjacent to the display assembly 20, the method 60 may return to any of blocks 64, 66, or 68. As such, the controller 40 may continue to receive indication(s) of the guest 16 and may update the augmented reality animation 52 by on the indication(s).

Based on a determination that the ride vehicle 12 is not in the position in front of and/or adjacent to the display assembly 20, the controller 40 may stop providing the augmented reality animation 52 to the display assembly 20, as indicated by the block 78. For example, the controller 40 may stop outputting signals to the display assembly 20 indicative of the update augmented reality animation 52. In response, the display assembly 20 may stop displaying the augmented reality animation 52. In this situation, the controller 40 may cause the display assembly 20 to show a canned animation, a blank screen, or another feature.

The controller 40 may iteratively perform each of the blocks and query 64, 66, 68, 70, 72, 74, and 76 to generate and provide the augmented reality animation 52 for viewing by the guest 16. For example, after initially generating and providing the augmented reality animation 52, the controller 40 may receive additional signal(s) from the facial recognition sensor 24, the skeletal recognition sensor 26, the presence sensor 28, or a combination thereof, and may update and provide the updated augmented reality animation 52 to the display assembly 20. As such, the controller 40 may update the augmented reality animation 52 based on the guest's movement of their body and/or facial features. The guest 16 may view each version of the augmented reality animation 52, and may continue to move their body and/or facial features to cause the augmented reality animation 52 to move. In this manner, the guest 16 may interact with and/or control the augmented reality animation 52. As such, the augmented reality system 22 may provide an interactive environment that provides entertainment for the guests 16.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An amusement ride system, comprising:
   a display assembly;
   a ride vehicle positioned on a ride path and configured to carry a guest;
   a facial recognition sensor configured to detect the guest's face;
   a skeletal recognition sensor configured to detect the guest's body;
   a presence sensor configured to detect the guest's presence in the ride vehicle; and
   a controller comprising a processor and a memory, wherein the controller is configured to:
      generate an augmented reality animation based on a first signal indicative of the guest's presence received from the presence sensor;
      in response to receiving a second signal indicative of the guest's body from the skeletal recognition sensor, update the augmented reality animation based on the guest's body;
      in response to receiving a third signal indicative of the guest's face from the facial recognition sensor, update the augmented reality animation based on the guest's face;
      provide the augmented reality animation to the display assembly for viewing by the guest; and
      update the augmented reality animation based on updated signals from the skeletal recognition sensor, the facial recognition sensor, or both.

2. The amusement ride system of claim 1, wherein the third signal indicative of the guest's face comprises an indication of the guest's facial features.

3. The amusement ride system of claim 1, wherein the guest's presence comprises a position in the ride vehicle.

4. The amusement ride system of claim 1, wherein the facial recognition sensor comprises an RGB camera.

* * * * *

UNITED STATES PATENT AND TRADEMARK OFFICE
CERTIFICATE OF CORRECTION

PATENT NO. : 10,636,218 B2
APPLICATION NO. : 16/212412
DATED : April 28, 2020
INVENTOR(S) : Melo et al.

Page 1 of 1

It is certified that error appears in the above-identified patent and that said Letters Patent is hereby corrected as shown below:

On the Title Page

Item (54), delete "Augmented Reality for an Amusement Ride," and insert -- Augmented Reality System for an Amusement Ride, --, therefor.

Signed and Sealed this
Twenty-fourth Day of November, 2020

Andrei Iancu
*Director of the United States Patent and Trademark Office*